(12) United States Patent
Sasaki

(10) Patent No.: US 7,567,251 B2
(45) Date of Patent: Jul. 28, 2009

(54) TECHNIQUES FOR CREATING FACIAL ANIMATION USING A FACE MESH

(75) Inventor: Daichi Sasaki, Seattle, WA (US)

(73) Assignees: Sony Corporation, Tokyo (JP); Sony Electronics, Inc., Parkridge, NJ (US)

( * ) Notice: Subject to any disclaimer, the term of this patent is extended or adjusted under 35 U.S.C. 154(b) by 112 days.

(21) Appl. No.: 11/396,159

(22) Filed: Mar. 31, 2006

(65) Prior Publication Data

US 2007/0159486 A1    Jul. 12, 2007

Related U.S. Application Data

(60) Provisional application No. 60/758,122, filed on Jan. 10, 2006.

(51) Int. Cl.
*G06T 13/00* (2006.01)
*G06T 15/70* (2006.01)

(52) U.S. Cl. ..................................................... 345/473

(58) Field of Classification Search ................. 345/473; 385/276
See application file for complete search history.

(56) References Cited

U.S. PATENT DOCUMENTS

| | | | |
|---|---|---|---|
| 6,532,011 B1 | 3/2003 | Francini et al. | |
| 6,664,956 B1 * | 12/2003 | Erdem | ........................ 345/419 |
| 6,665,643 B1 | 12/2003 | Lande et al. | |
| 6,735,566 B1 | 5/2004 | Brand | |
| 6,807,290 B2 | 10/2004 | Liu et al. | |
| 6,850,872 B1 | 2/2005 | Marschner et al. | |
| 6,879,946 B2 | 4/2005 | Rong et al. | |
| 6,919,892 B1 | 7/2005 | Cheiky et al. | |
| 6,944,320 B2 | 9/2005 | Liu et al. | |
| 6,950,104 B1 | 9/2005 | Marschner et al. | |
| 6,950,537 B2 * | 9/2005 | Liu et al. | ..................... 382/118 |

(Continued)

FOREIGN PATENT DOCUMENTS

WO    WO03105720 A2    12/2003

OTHER PUBLICATIONS

Zhang et al.; Spacetime Faces: High Resolution Capture for Modeling and Animation; University of Washington; pages 1-11.

(Continued)

*Primary Examiner*—Kee M Tung
*Assistant Examiner*—Jacinta Crawford
(74) *Attorney, Agent, or Firm*—Brian N. Young; Trellis IP Law Group, PC

(57) ABSTRACT

Techniques for creating facial animation using a face mesh are provided. The techniques include determining a face mesh sequence. A portion of the face mesh sequence is then fitted to an image of the face. For example, a first frame of the face mesh sequence is fitted to the image. The face image is then projected onto the portion of the face mesh based on the fitting. Also, a hair model may be generated and fitted onto the face mesh sequence. Additionally, changes in color differences between sequences of the face mesh may be computed. The face mesh sequence is then played to create a facial animation sequence for the face image. The color differences that were created may also be added to the sequences as they are being played. Accordingly, the playing of the face mesh sequence creates a realistic facial animation of the image of the face.

21 Claims, 17 Drawing Sheets

U.S. PATENT DOCUMENTS

| | | | |
|---|---|---|---|
| 6,967,658 | B2 | 11/2005 | Hunter et al. |
| 6,975,750 | B2 | 12/2005 | Yan et al. |
| 6,980,671 | B2 | 12/2005 | Liu et al. |
| 6,993,163 | B2 | 1/2006 | Liu et al. |
| 7,215,822 | B2* | 5/2007 | Murai et al. ............... 382/264 |
| 2005/0057569 | A1* | 3/2005 | Berger ...................... 345/473 |
| 2006/0023923 | A1* | 2/2006 | Geng et al. ............... 382/116 |

OTHER PUBLICATIONS

Vlasic et al.; Face Transfer with Multilinear Models; SIGGRAHP 2005; Mitsubishi Electronic Research Laboratories; pp. 1-8.

Pighin et al.; Synthesizing Realistic Facial Expressions from Photographs; University of Washington; pp. 1-10.

Liu et al.; Expressive Expression Mapping with Ratio Images; Microsoft Rearch; pp. 1-6.

http://www.af.mil/news/story.print.asp?id=12301251. By Staff Sgt. Alicia Prakash, "C-17s airlift Qatari mobile hosptial to Pakistan" Oct. 2005.

URL:/1024/en/breaking_news/2005%20Press%20Releases/20051103_Transhospital.html. By EADS. "EADS Mobile . . ." Apr. 2008.

http://www.acep.org/pressroom.aspx?id =25825. By American College of Emergency Physicians. "One-of-a-Kind Mobile Hospital . . ." Apr. 2008.

http://findarticles.com/p/articles/mi_m3257/is_2_60/ai_n16069825/print. By Carole J. Bolster. "Mobile Hospital provides care when disaster . . ." Feb. 2006.

Zhengyou Zhang et al.: "Robust and Rapid Generation of Animated Faces from Video Images: A Model-Based Modeling Approach" International Journal of Computer Vision, Kluwer Academic Publishers, BO, vol. 58, No. 2, Jul. 1, 2004, pp. 93-119, XP019216414.

Choi K-H et al.: "Automatic Creation of a Talking Head From a Video Sequence" IEEE Transactions on Multimedia, IEEE Service Center, Piscataway, NJ, US, vol. 7, No. 4, Aug. 2005, pp. 628-637, XP011136184.

Fua P. et a.: "From synthesis to analysis: fitting human animation models to image data" Computer Graphics International, 1999. Proceedings Canmore, ALTA., Canada Jun. 7-11, 1999, Los Alamitos, CA, USA, IEEE Compt. Soc. US, Jun. 7, 1999, pp. 4-11, XP010340026.

Ostermann J. et al.: "Animated Talking Head With Personalized 3D Head Model" Journal of VLSI Signal Processing Systems for Signal, Image, and Video Technology, Springer, New York, NY, US, vol. 20, No. 1/2, Oct. 1, 1998, pp. 97-104, XP000786730.

* cited by examiner

TECHNIQUES FOR CREATING FACIAL ANIMATION USING A FACE MESH

CROSS REFERENCES TO RELATED APPLICATIONS

This application claims priority from U.S. Provisional Patent Application No. 60/758,122, entitled "Method and Apparatus for Creating Facial Animation", filed Jan. 10, 2006, which is incorporated by reference in its entirety for all purposes.

BACKGROUND OF THE INVENTION

Embodiments of the present invention generally relate to computer graphics and more specifically to techniques for creating facial animation using a face mesh.

Automated generation of realistic face animation is one of the most difficult problems in the computer graphics field. For example, creating a realistic natural expression for the changes of a person laughing (or performing any other action) is very difficult. This is because most people are very sensitive to a minute change in a facial expression. When people look at computer-generated graphics where the minute changes are not animated precisely, the animation does not look realistic.

To create facial animation, changes in the facial expression may be manually entered to create the animation. For example, conditions need to be entered for the exact form, the exact timing of the motion of each part, and the change of the lightness and darkness on the skin that accompanies the change of form in the face. This requires skill and a lot of time. Even if the manually-entered changes create a realistic facial animation, the amount of time to input those changes may not make it worth it. Further, it is more difficult to create an animation when using only a single image of a user as input. Even when changes are manually entered, the resulting facial expression may not be realistic.

SUMMARY OF EMBODIMENTS OF THE INVENTION

Embodiments of the present invention generally relate to techniques for creating facial animation using a face mesh. In one embodiment, the techniques include determining a face mesh sequence. A portion of the face mesh sequence is then fitted to an image of the face. For example, a first frame of the face mesh sequence is fitted to the image. The face image is then projected onto the portion of the face mesh based on the fitting. Also, a hair model may be generated and fitted onto the face mesh sequence. Additionally, color differences between sequences of the face mesh may be computed. The face mesh sequence is then played to create a facial animation sequence for the face image. The color differences that were created may also be added to the sequences as they are being played. Accordingly, the playing of the face mesh sequence creates a realistic facial animation of the image of the face.

In one embodiment, a method for creating facial animation is provided. The method comprises: determining a face mesh sequence; fitting a face mesh of the face mesh sequence to an image of a face, wherein displacement values for vertices of the face mesh are determined in the fitting; projecting the face image onto the face mesh as texture based on the fitting; adding the displacement values to vertices in subsequent face meshes in the face mesh sequence; and playing the face mesh sequence to create facial animation for the face image.

In one embodiment, a device for creating facial animation is provided. The device comprises: logic configured to determine a face mesh sequence; logic configured to fit a face mesh of the face mesh sequence to an image of a face, wherein displacement values for vertices of the face mesh are determined in the fitting; logic configured to project the face image onto the face mesh as texture based on the fitting; logic configured to add the displacement values for vertices in subsequent face meshes in the face mesh sequence; and logic configured to play the face mesh sequence to create facial animation for the face image.

A further understanding of the nature and the advantages of the inventions disclosed herein may be realized by reference of the remaining portions of the specification and the attached drawings.

DETAILED DESCRIPTION OF EMBODIMENTS OF THE INVENTION

Overview

A face mesh sequence may be used to create facial animation. A face mesh sequence may be a set of face form meshes that are acquired between each time of expression changes or a deliverance of speech. The face mesh sequence is a grade, e.g., more than 20 frames per second, that looks smooth at the time of reproduction. Each face mesh of the sequence can express a form of the face in detail, such as about 20,000 vertices. The position, the amount of movements, and color data for each vertex can be acquired for each frame of the face mesh sequence.

In one embodiment, the face mesh sequence of a user (e.g. a human person) is acquirable using known systems. The face mesh sequence may be of the user in which an image will be used to create a facial animation. However, if a face mesh of the user cannot be taken, a face mesh of another user may be used. The face mesh of the other user may then be modified to fit the image of the user.

Figure 1:
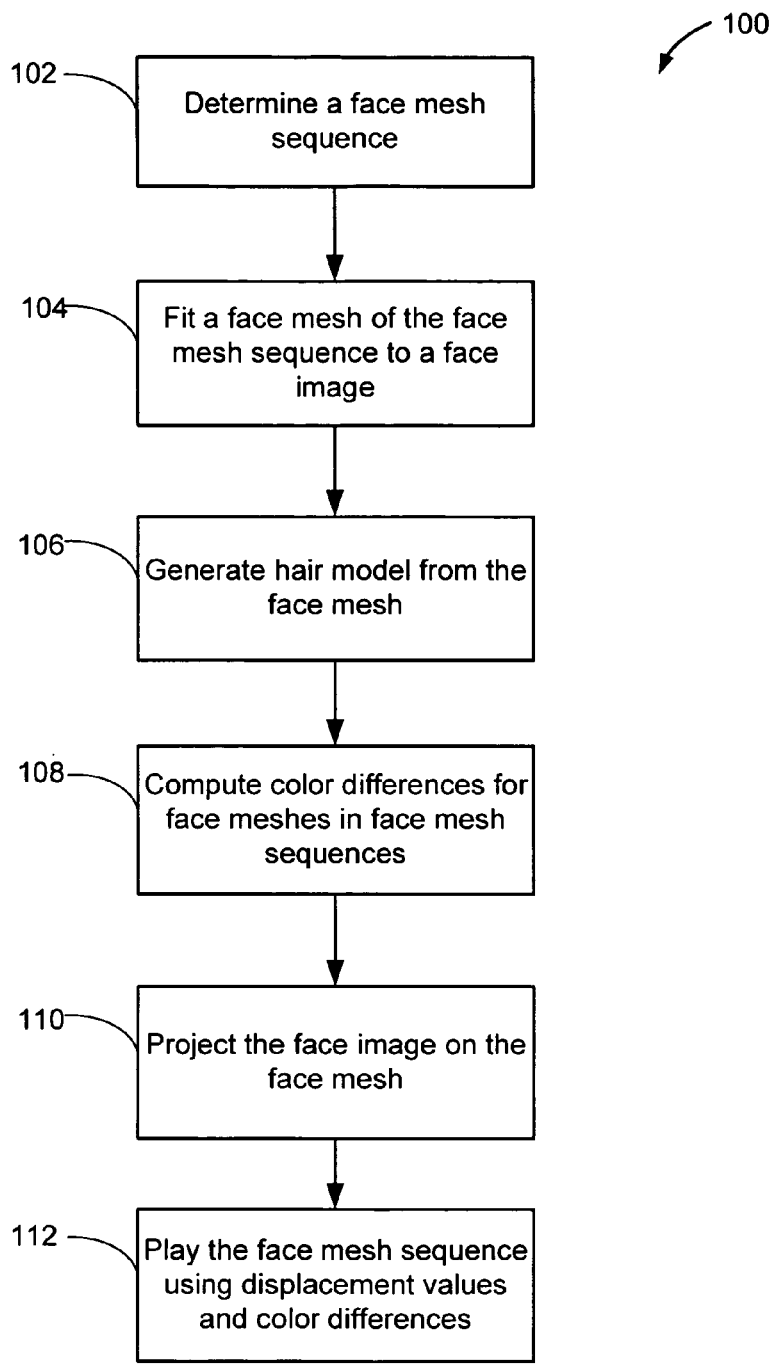
FIG. 1 depicts a simplified flow chart of a method for creating facial animation according to one embodiment of the present invention.

FIG. 1 depicts a simplified flow chart 100 of a method for creating facial animation according to one embodiment of the present invention. Step 102 determines a face mesh sequence. The face mesh sequence may be captured from a user.

Step 104 fits a face mesh of a face mesh sequence to a face image. The face image may be an image (e.g. a picture) of the same user in which the face mesh sequence was captured. However, the face mesh sequence and face image may be captured from different users in other embodiments. The face mesh may be the first frame of the face mesh sequence. This first frame may correspond to the face image.

The fitting process may deform the face mesh. Displacement values may be determined based on the face mesh and the deformed face mesh. These values are saved and will be used to deform all the face meshes in the face mesh sequence later in the playing of the face mesh sequence.

Step 106 generates a hair model from the face mesh. The hair model creates a face mesh area for the hair. This process will be described in more detail below.

Step 108 computes the difference in color for face meshes in the face mesh sequence. The difference in color may be computed for vertices in different face meshes in the sequence. The effect on including the differences in color will be described in more detail below but the result is that the change in lightness and darkness accompanying a change in form are displayed in the facial animation.

Step 110 projects the face image on the face mesh and the hair mesh. Thus, the face mesh included shows the face image in addition to the hair.

Step 112 plays the face mesh sequence with the hair model using displacement values and the computed differences in color. The displacement values may be added to all the face meshes in the face mesh sequence. Also, the color differences are added. Then, the face mesh sequence is played. In playing the face mesh sequence, an animation of the face image is provided. By adding the computed difference in color, change in lightness and darkness are shown.

Face Mesh Fitting Process

Figure 2:
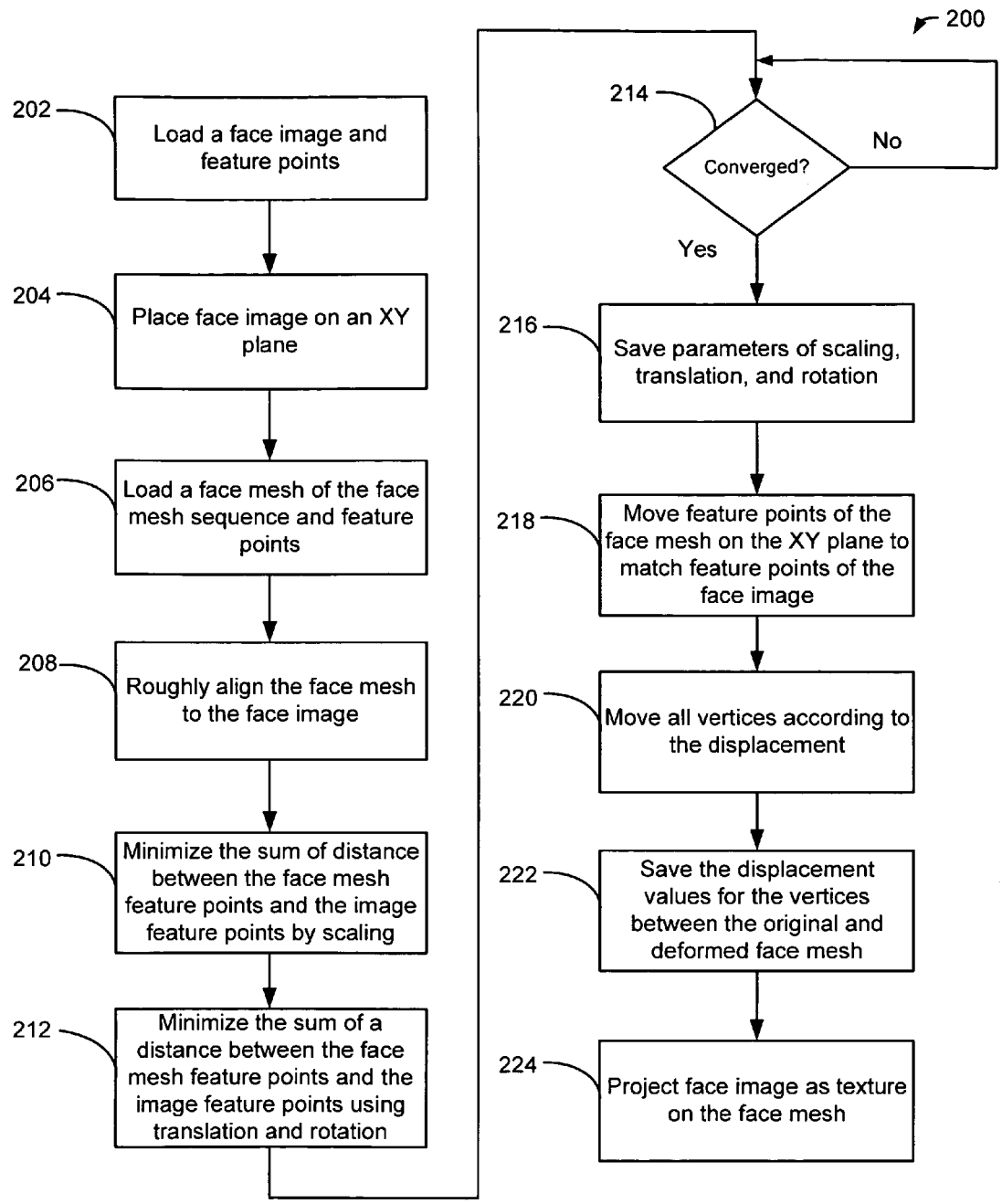
FIG. 2 depicts a simplified flow chart of a method for fitting a face mesh of a face mesh sequence to the face image.

FIG. 2 depicts a simplified flow chart 200 of a method for fitting a face mesh of a face mesh sequence to the face image. Although this method is described, it will be recognized that variations of the method will be appreciated.

Step 202 loads a face image and feature points for the face image. The feature points may be any points on the face image. For example, the feature points may be selected in places where distinct features of a face image are found, such as the eyes, mouth, nose, etc. The feature points may be acquired using known methods.

Figure 3:
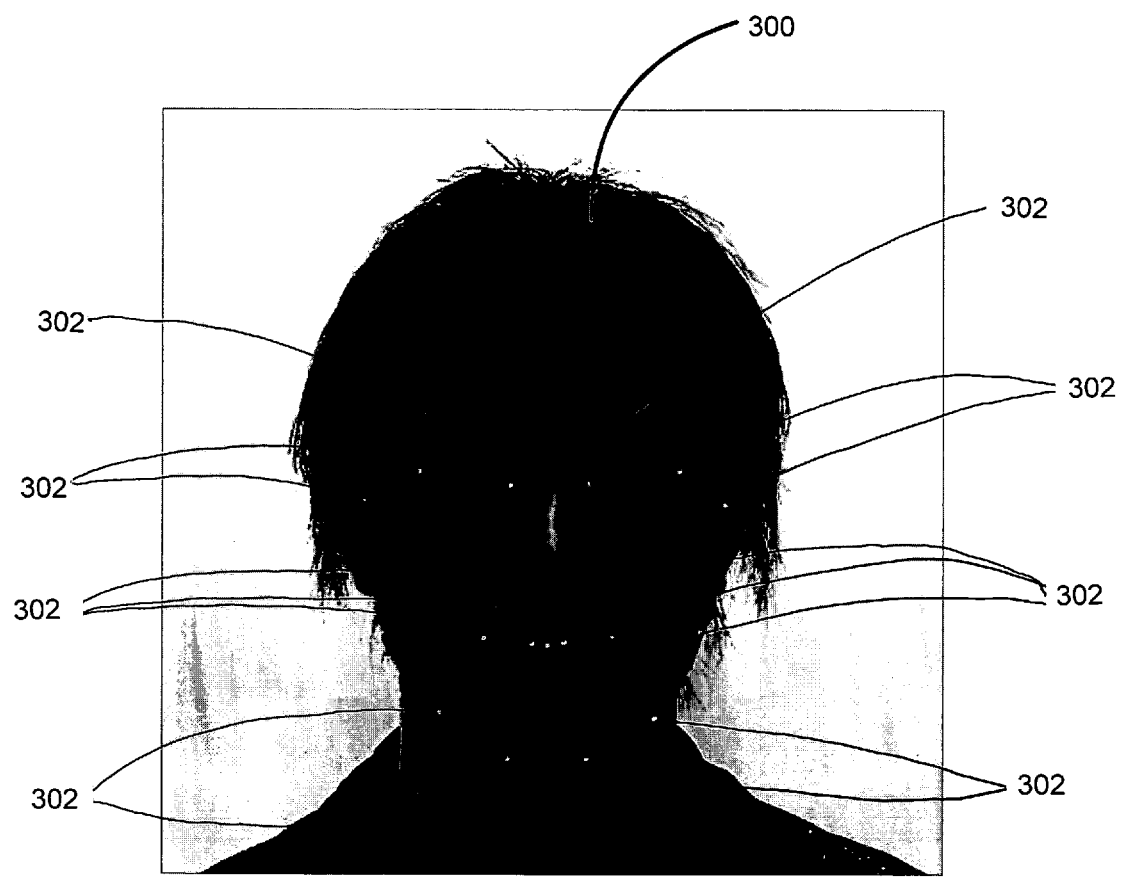
FIG. 3 shows an example of a face image and feature points according to one embodiment of the present invention.

FIG. 3 shows an example of a face image and feature points according to one embodiment of the present invention. As shown, feature points 302 are shown as white dots in face image 300. Feature points are placed near the eyes, mouth, ears, and chin in one embodiment. Although these feature points 302 are shown, it will be recognized that other feature points 302 may also be used.

Step 204 places face image 300 on an XY plane. The XY plane may be displayed on any computing device.

Step 206 loads a face mesh of the face mesh sequence and feature points of the face mesh. A face mesh that is loaded may be a portion of the face mesh sequence, such as a frame of the face mesh sequence. In one embodiment, the first frame of the face mesh sequence is taken from the user found in face image 300. The face mesh may be a 3D mesh capture from the face mesh sequence. The feature points found on the face mesh may be determined using the same algorithm used in finding the feature points in face image 300.

Figure 4:
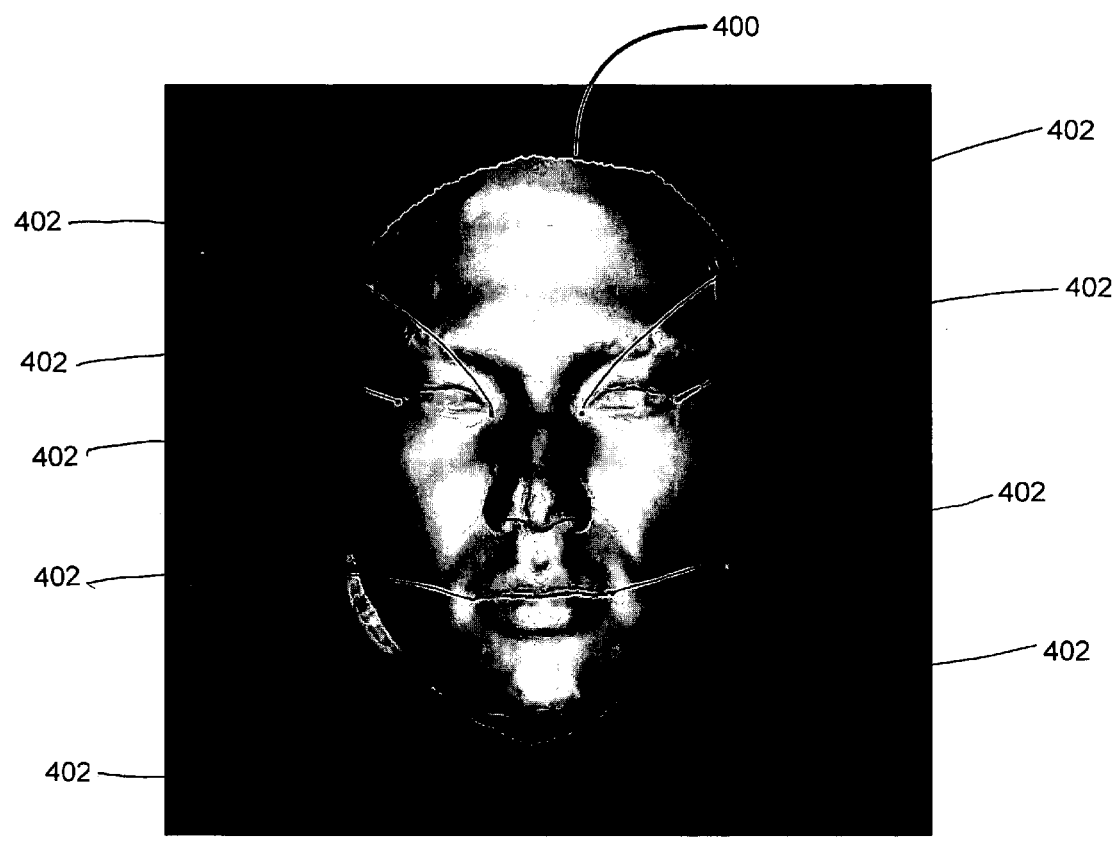
FIG. 4 depicts a face mesh with feature points according to one embodiment of the present invention.

FIG. 4 depicts a face mesh 400 with feature points 402 according to one embodiment of the present invention. Feature points 402 may be vertices (e.g., a point in 3D space with a particular location) in face mesh 400. Feature points 402 may be determined by the user or by a process. Feature points 402 are placed near the eyes, mouth, ears, and chin in one embodiment.

Figure 5:
FIG. 5 depicts an initial fitting according to one embodiment of the present invention.

Step 208 roughly aligns face mesh 400 to face image 300. The alignment may be performed automatically or manually. FIG. 5 depicts an initial fitting according to one embodiment of the present invention. As shown, face mesh 400 has been roughly fitted over the face in face image 300. As shown, face mesh 400 does not completely cover the face. Thus, further adjusting may be required.

Step 210 minimizes a sum of the distance between the projected face mesh feature points 402 to the image plane and the image feature points 302 by scaling. Known equations may be used to minimize the distance between face mesh feature points 402 and image feature points 302. Scaling may, for example, increase or decrease the size of face mesh 400 to fit face image 300.

Step 212 minimizes the sum of a distance between the projected face mesh feature points 402 to the image plane and the face image feature points 302 using translation and rotation. Known equations may be used to minimize the distance between face mesh feature points 402 and image feature points 302. The translation may move face mesh 400 to match face image 300. Similarly, face mesh 400 may be rotated to match face image 300.

Step 214 determines if the minimization is converged. That is, it is determined if the sum of distances between feature points 302 and projected points of the corresponding feature points 402 to the image plane is minimized. Steps 210 and 212 are repeated if it is determined that feature points 302 and feature points 402 are not converged.

If they are converged, step 216 saves the parameters of scaling, translation, and rotation that were determined in steps 210 and 212. These parameters are the parameters that are used to scale, translate, and rotate face mesh 400.

Step 218 moves feature points 402 of the face mesh 400 on the XY plane to match feature points 302 of face image 300. Minimizing the sum between face mesh feature points 402 and face image feature points 302 may not make them exactly match. Thus, this adjusting step is performed to match them.

Step 220 moves all vertices according to the displacement of face mesh feature points 402 and face image feature points 402. These displacements can be computed using a radial basis function based on the displacement of the feature points obtained in step 222. A radial basis function is an interpolation method that can be used to deform an object in computer graphics. Other functions may also be appreciated.

Figure 6:
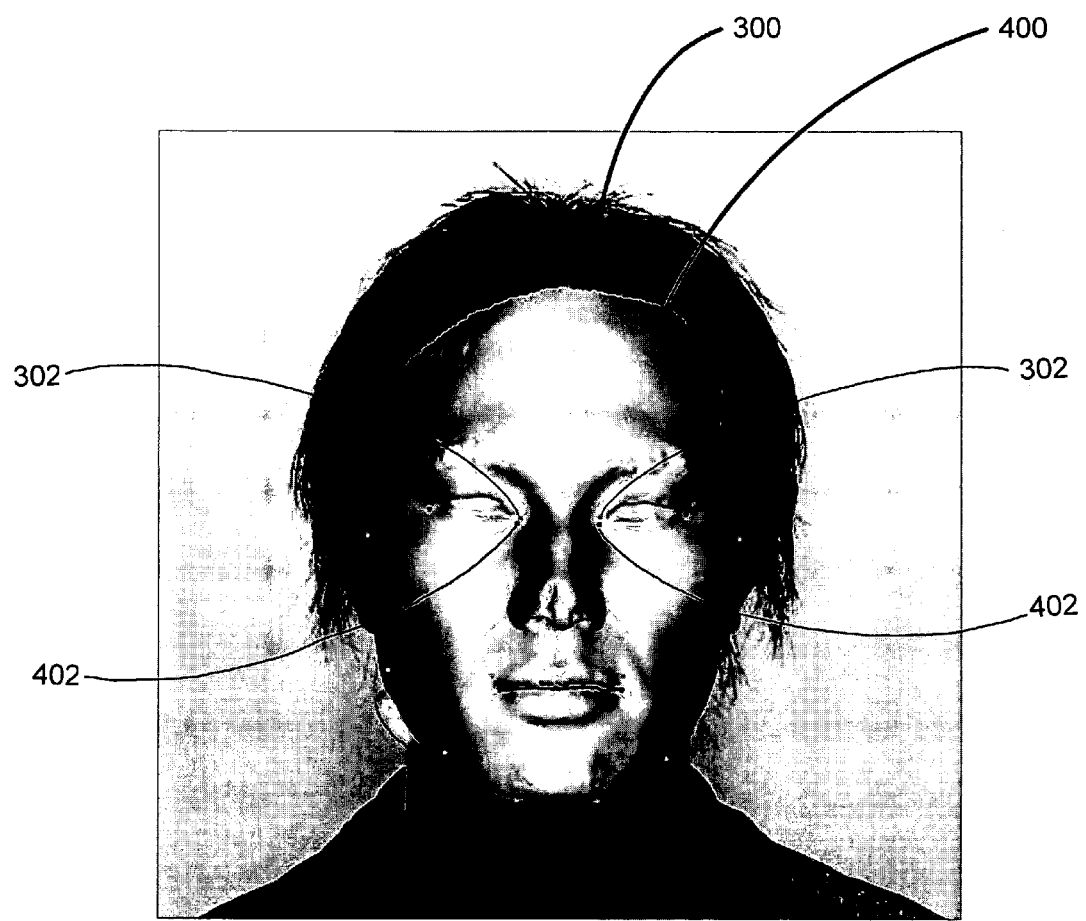
FIG. 6 depicts a face mesh that has been fitted by scaling, translation, and rotation.

FIG. 6 depicts face mesh 400 that has been fitted by scaling, translation, and rotation. As shown, face mesh 400 roughly corresponds to the user's face. Face mesh 400 has been scaled by being made larger and also rotated and translated to match face image 300. However, face mesh feature points 402 may not exactly match image feature points 302. For example, around the eyes, feature points 402 do not exactly match feature points 302. Feature points 402 are then moved to match feature points 302. Also, the other vertices of face mesh 400 are then moved based on the movement of face mesh feature points 402.

Figure 7:
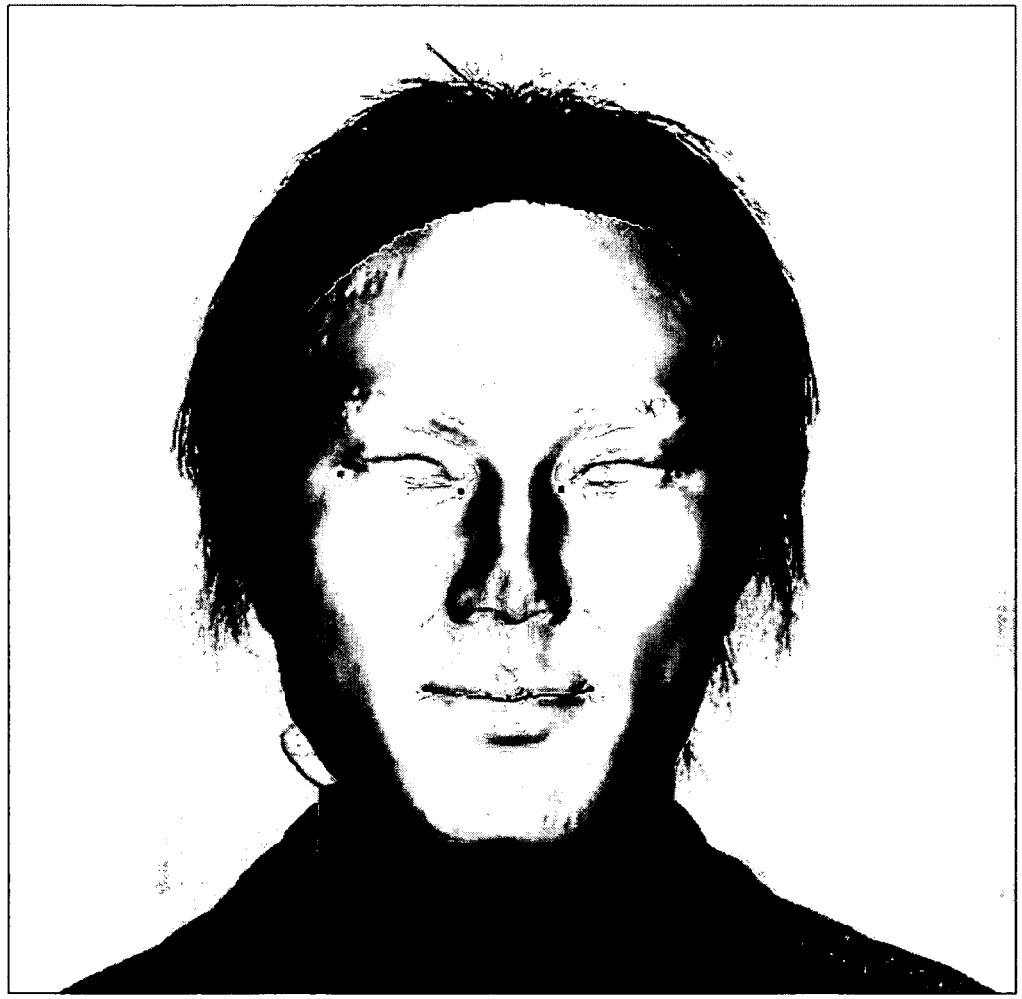
FIG. 7 shows the matching of face mesh feature points onto face image feature points according to one embodiment of the present invention.

FIG. 7 shows the matching of feature points 402 onto feature points 302 of face image 300 according to one embodiment of the present invention. As shown, face mesh feature points 402 and image feature points 302 match each other.

Step 222 saves the displacement values for the vertices between the original and deformed face mesh 400. The displacement values will be used when the face mesh sequence is later played. The displacement values are used align face mesh 400 to face image 300.

Figure 8:
FIG. 8 shows an image as projected as texture onto the face mesh.

Step 224 projects face image 300 as texture onto face mesh 400. Accordingly, the user's face image is projected onto the face mesh. FIG. 8 shows face image 300 as projected as texture onto face mesh 300. As shown, the face is shown as texture over face mesh 400.

Hair Modeling Process

Figure 9:
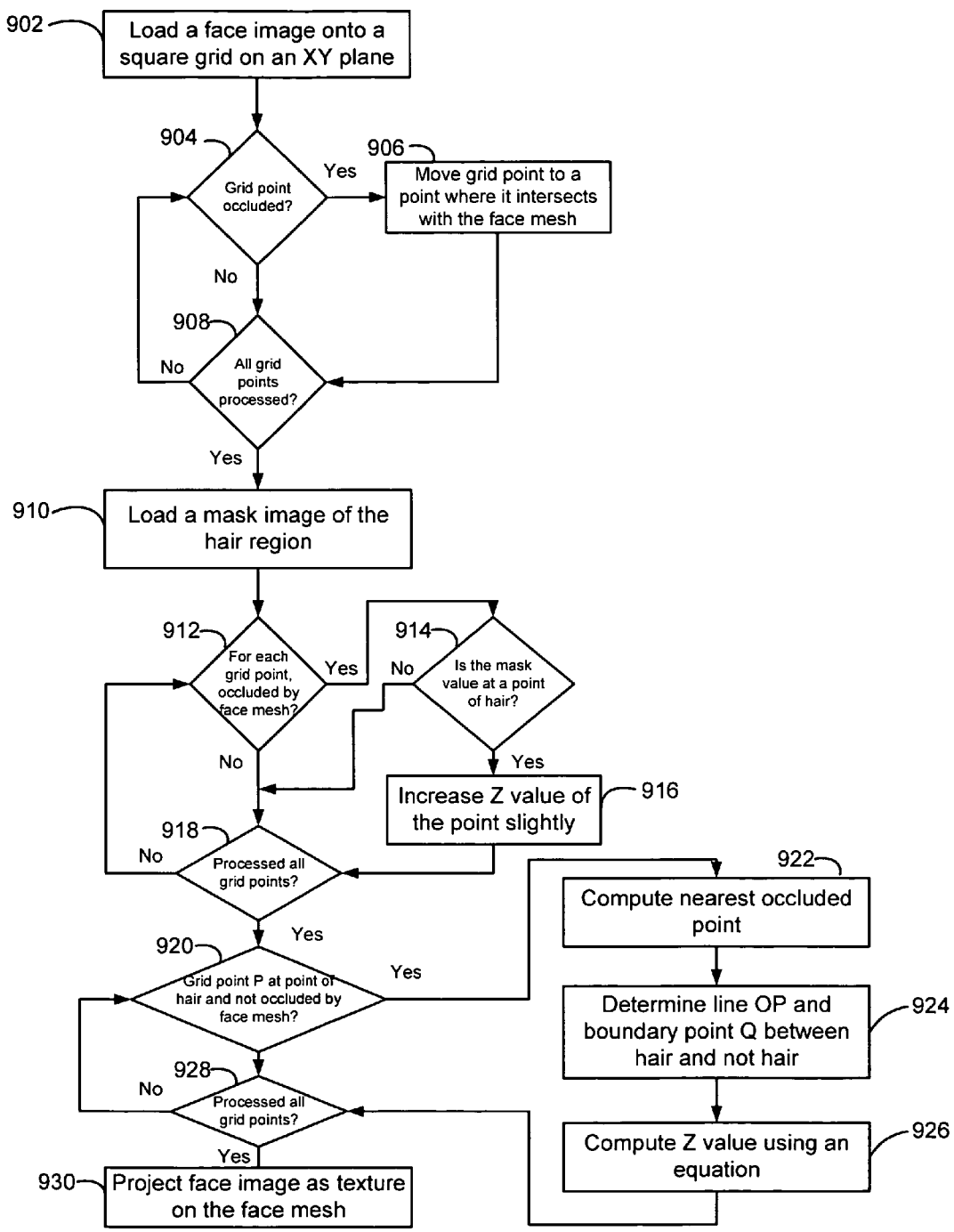
FIG. 9 depicts a simplified flow chart of a method for generating a hair model according to one embodiment of the present invention.

After fitting face mesh 400 to face image 300, a hair model may also be generated. The hair model is generated because the face mesh may not have modeled the hair. Thus, a hair model is generated and included in the face meshes such that hair from face image 300 can be projected as texture on it. FIG. 9 depicts a simplified flow chart 900 of a method for generating a hair model according to one embodiment of the present invention.

Step 902 loads face mesh 400 onto a square grid on an XY plane. The XY plane may be 100×100 grids, for example. Face mesh 400 is a 3D image and the XY plane is 2D. Thus, face mesh 400 needs to be places at some position in the Z space. For example, face mesh 400 may be loaded such that the Z values of it are towards the positive axis (i.e., the XY plane is at the back of the face mesh or the front part of the face is facing forward from the XY plane if looking at a display screen). Although a square grid is described, the hair model can also be created using 3D polygons rather than the square grid.

Because face mesh 400 is a 3D model, grid points of the XY plane are moved in the Z direction to meet a point on face mesh 400. This creates a 3D model of the grid. Thus, step 904 determines for each grid point, if it is occluded (i.e., obstructed) by face mesh 702. If the grid point is occluded by face mesh 702, then step 906 moves the grid point to a point where it intersects with face mesh 400. For example, the grid point is moved in the positive direction (i.e., forward) until it intersects with the Z value of a corresponding face mesh 400 value.

Step 908 then determines if all grid points have been processed. If not, the process reiterates to step 904 to process another grid point.

If the grid point is not occluded by the face mesh 702, then the face mesh is not moved. This is the area outside of face mesh 400.

Once all the grid points have been processed, step 910 loads a mask image 1002 of a hair region. The hair region may be modeled using known methods.

Figure 10:
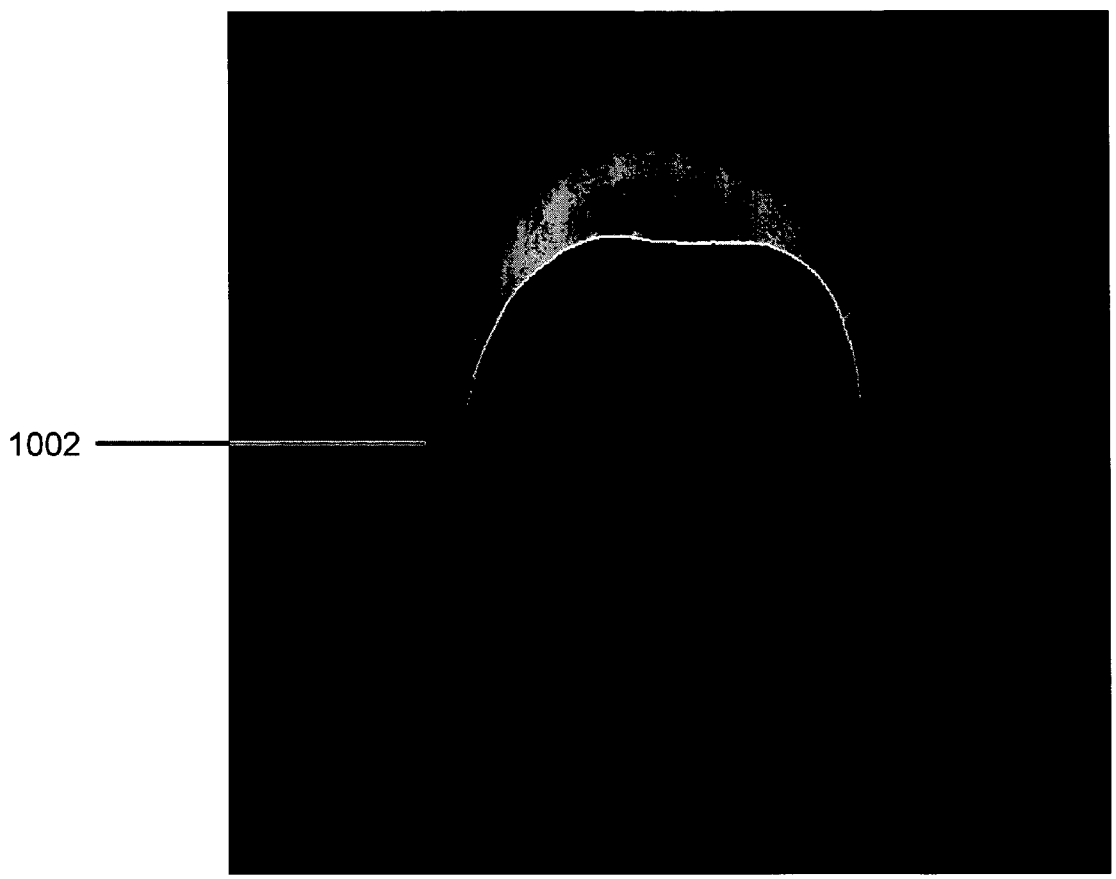
FIG. 10 shows a mask image of a hair region according to one embodiment of the present invention.

FIG. 10 shows a mask image 1002 of a hair region according to one embodiment of the present invention. As shown, mask image 1002 of the hair region models a hair region that may be captured. For example, the outline of the hair in face image 300 may be taken. Mask image 1002 may then be set on face mesh 400.

There may be some areas of face mesh 400 that include hair areas. These areas are raised slightly in the positive Z direction for a point on face mesh 400. This is because in animation, hair may be raised from the skin for life-like animation. It will be recognized that the hair does not need to be raised in some embodiments.

Step 912 determines for each grid point, if it is occluded by face mesh 400. If the grid point is not occluded by the face mesh, the process continues to step 918. Further, if the mask value in step 914 is not at a point that indicates it is hair, then the process proceeds to step 918, which determines if all grid points have been processed. If not, the process reiterates to step 912.

If the grid point is occluded by face mesh 400, step 914 determines if the mask value at the point indicates it is hair. For example, a value may be computed on face mesh 400 of the hair in a position corresponding to a grid pixel. In step 916, if the value is 1, the Z value of the point may be increased slightly. To determine that a vertex on face mesh 400 has a value of 1, the vertex is projected to the mask image 1002 and the mask value is checked there. If the value is 1, the vertex is a part of hair. This is because the point is part of mask image 1002, which is the hair region.

Step 918 determines if all grid points have been processed. If not, the process reiterates to step 912.

When all grid points have been processed, points occluded by mask image 1002 may be processed. Step 920 determines for each grid point P if it is part of mask image 1002 that indicates a mask value of "hair" and is not occluded by face mesh 400. That is, is the grid point part of mask image 1002 but not part of face mesh 400. If not, nothing is performed and the process proceeds to step 928, described below.

If the mask value indicates it is hair, then the grid point is raised in a way to model a person's hair. For example, a person's hair may slightly scale backwards in the Z direction. This may be modeled using the following steps. Step 922 computes the nearest occluded point (O). Step 924 then determines along the line OP (but not in the segment OP), the boundary point, Q, between hair and not hair.

Step 926 computes the Z value of P using an equation, such as the equation $Pz=Qz+w*(Oz-Qz)$. $Pz$, $Oz$, and $Qz$ are the Z values of P, O, and Q, respectively. Also, $w=1-OP/OQ^2$. This interpolates a Z value for the grid point P. It will be recognized that other methods of interpolating a Z value for grid point P will be appreciated.

Step 928 determines if all grid points have been processed. If not, the process reiterates to step 920.

Figure 11:
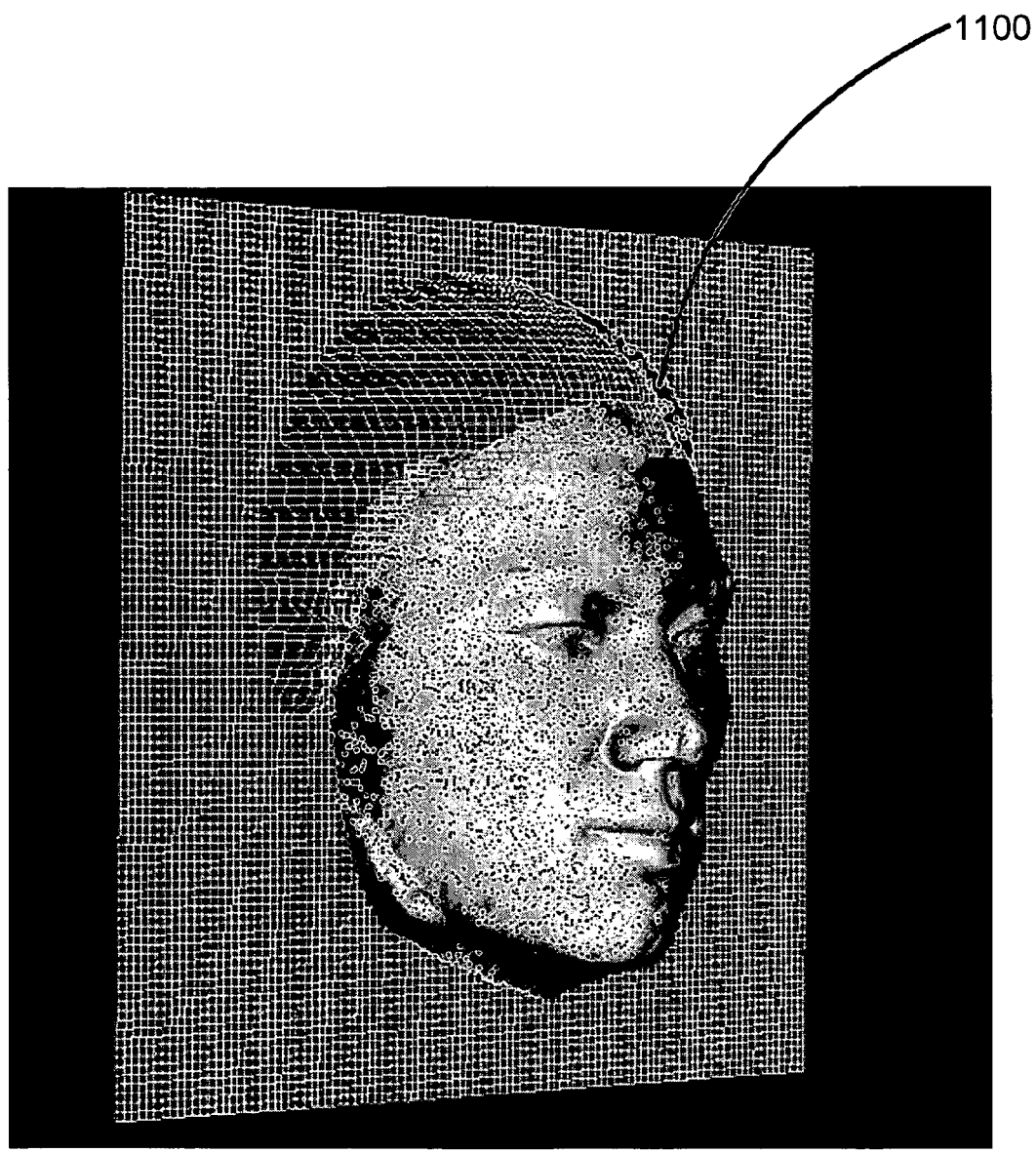
FIG. 11 shows a hair model projected onto the face mesh.

When all grid points have been processed, a hair model has been generated. The hair model is a mesh whose vertices are the grid points. FIG. 11 shows a hair model 1100.

Color Differences

Figure 12:
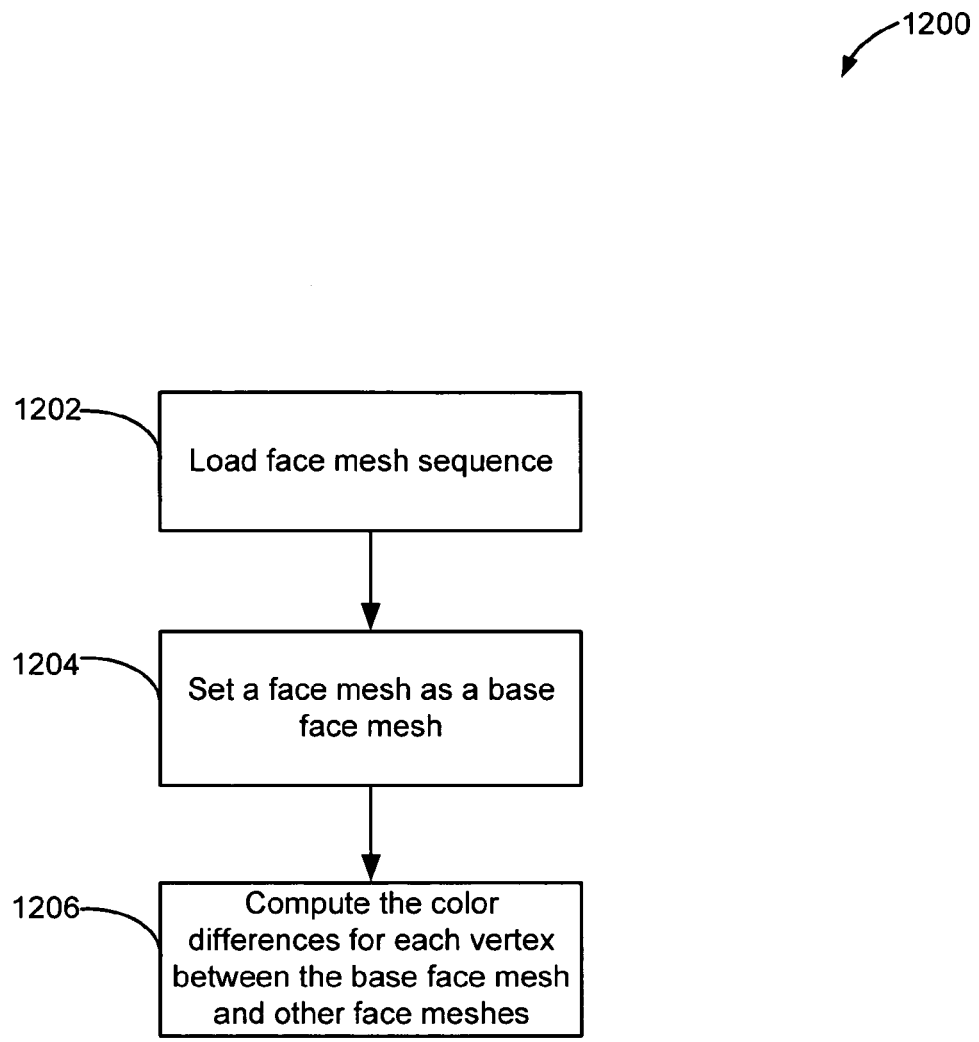
FIG. 12 depicts a simplified flow chart of a method for computing the color differences according to one embodiment of the present invention.

The difference in color for vertices in a face mesh sequence may also be calculated. This captures the difference in color from different expressions. For example, when a face moves from one expression to another, the color of certain areas may become lighter or darker. These color differences are calculated and later added for the facial animation. FIG. 12 depicts a simplified flow chart 1200 of a method for computing the color differences according to one embodiment of the present invention.

Step 1202 loads the face mesh sequence. Step 1204 sets face mesh 400 (e.g., the first face mesh of a face mesh sequence) as a base face mesh. The base face mesh may be a first frame of the face mesh sequence. The base face mesh may be an expression that is close to the expression found in face image 300. Also, in another embodiment, the base face mesh may be the mean shape of all the face meshes.

Step 1206 computes the color differences for each vertex between the base mesh and other face meshes in the sequence. The color differences may be computed using known methods. The difference may be a value in which the color should be increased or decreased from the base face mesh to another face mesh. A color difference may be calculated based on RGB (red, green, blue) model. The color difference may be the color value of a subsequent face mesh is subtracted from the color value of the base face mesh at a vertex. A positive color difference may be a lighter color and a negative color difference is a darker color.

Any positive color differences may be ignored in one embodiment. These differences may create white spots on an image. Thus, only negative color differences may be used. Also, if the resulting texture caused by the color differences does not look good (such as around the mouth or eye corners), color differences may be ignored in those regions.

In another embodiment, the color differences can be represented as grey scale rather than the difference in each color channel, such as an RGB color scheme. An exaggerated face (in terms of color) can be created by detecting the color difference that exceeds some threshold and is applied as different colors (e.g. black and white) to the base texture. A 3D version of the expression ratio image can be used to represent the color differences.

Also, the option of adding color differences can be represented as texture blending rather than a vertex-wise operation. In this case, the color differences are rendered first. The resulting images are then added to the rendered image of the face mesh. This is kind of a image blending. The color differences can be added for each vertex (which was described earlier). Or, the color difference can be rendered in a "not difference-added" mesh and the same mesh colored with the color difference separately, and then both rendered images are added pixelwise. Either way may add color differences.

Figure 13:
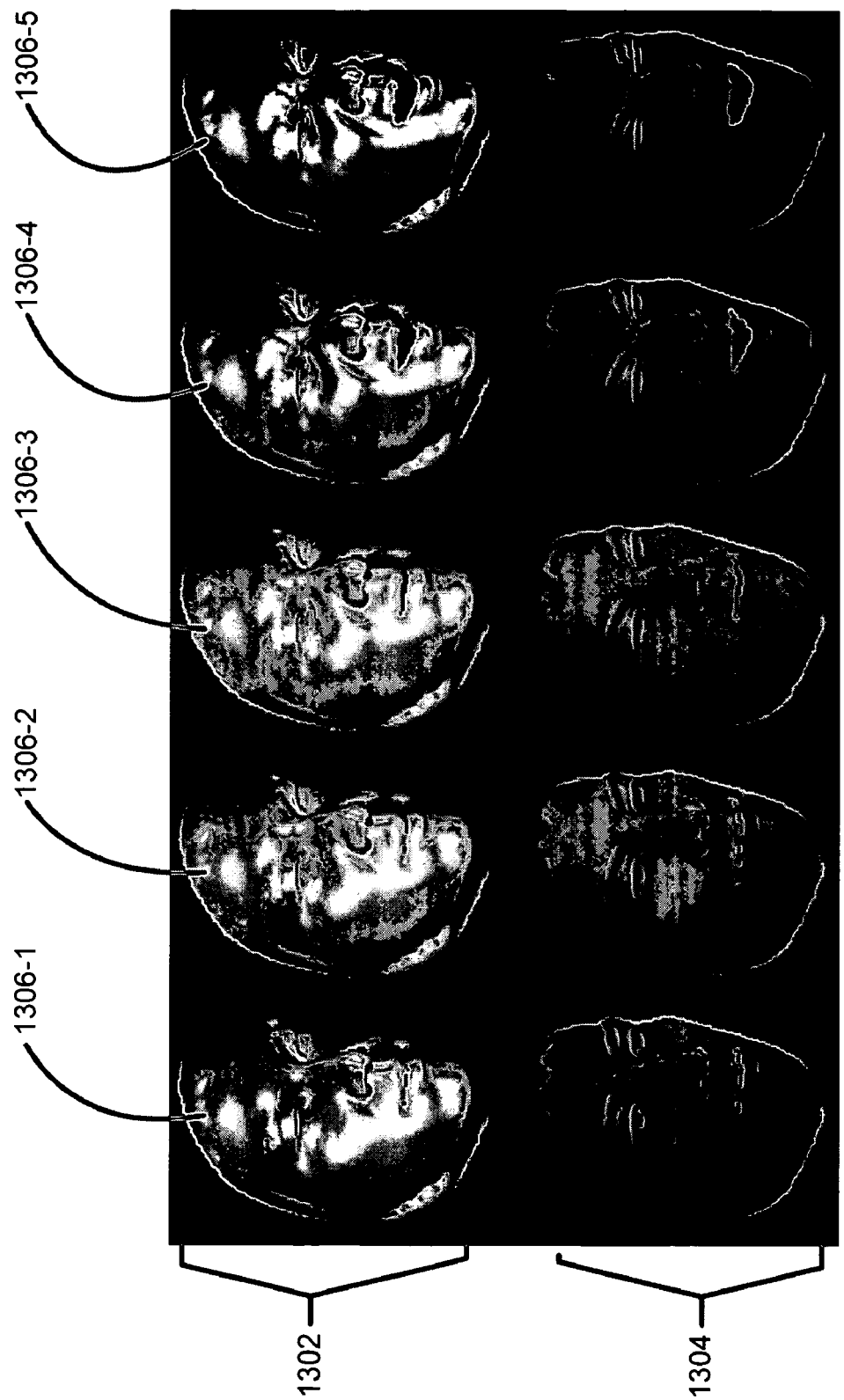
FIG. 13 shows the differences in color according to one embodiment of the present invention.

FIG. 13 shows the differences in color according to one embodiment of the present invention. A top row 1302 shows a face mesh without color. Row 1304 shows an image that includes color. Row 1304 shows what an original capture of a sequence would look like for reference.

Each face mesh 1306 and a corresponding face image 1308 are shown. Differences in color between face meshes 1306 may be calculated. For example, the color differences between face mesh 1306-1 and face mesh 1306-2, the difference between face mesh 1306-1 and face mesh 1306-3, etc. may be calculated.

Step 1208 then stores the color differences for each vertex. The color differences will be used when the face mesh sequence is later played.

Figure 14:
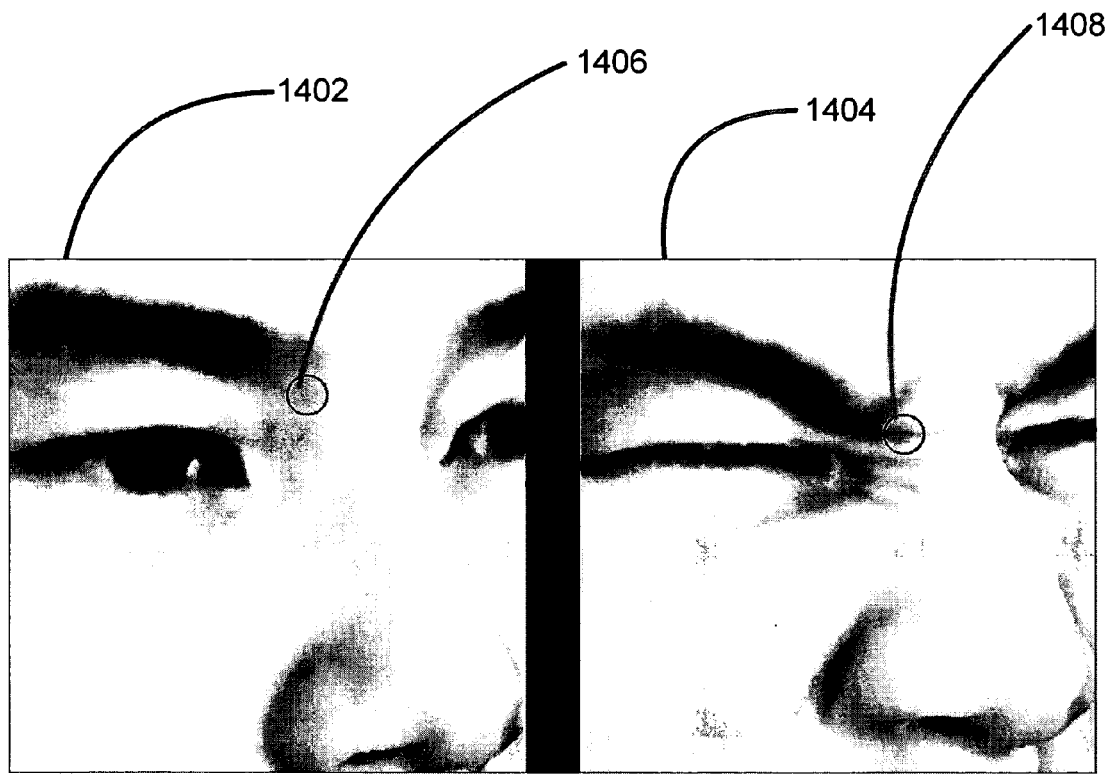
FIG. 14 shows the differences when not using the differences in color for the vertices and using the differences in color.

FIG. 14 shows the differences in color when a face squints in the original face mesh. As shown, image 1404 shows the changes in color that occur in the expression when the expression is changed from image 1402. As shown, circle 1408 shows a darkness that occurs for a change in form from the image in circle 1406.

Figure 15:
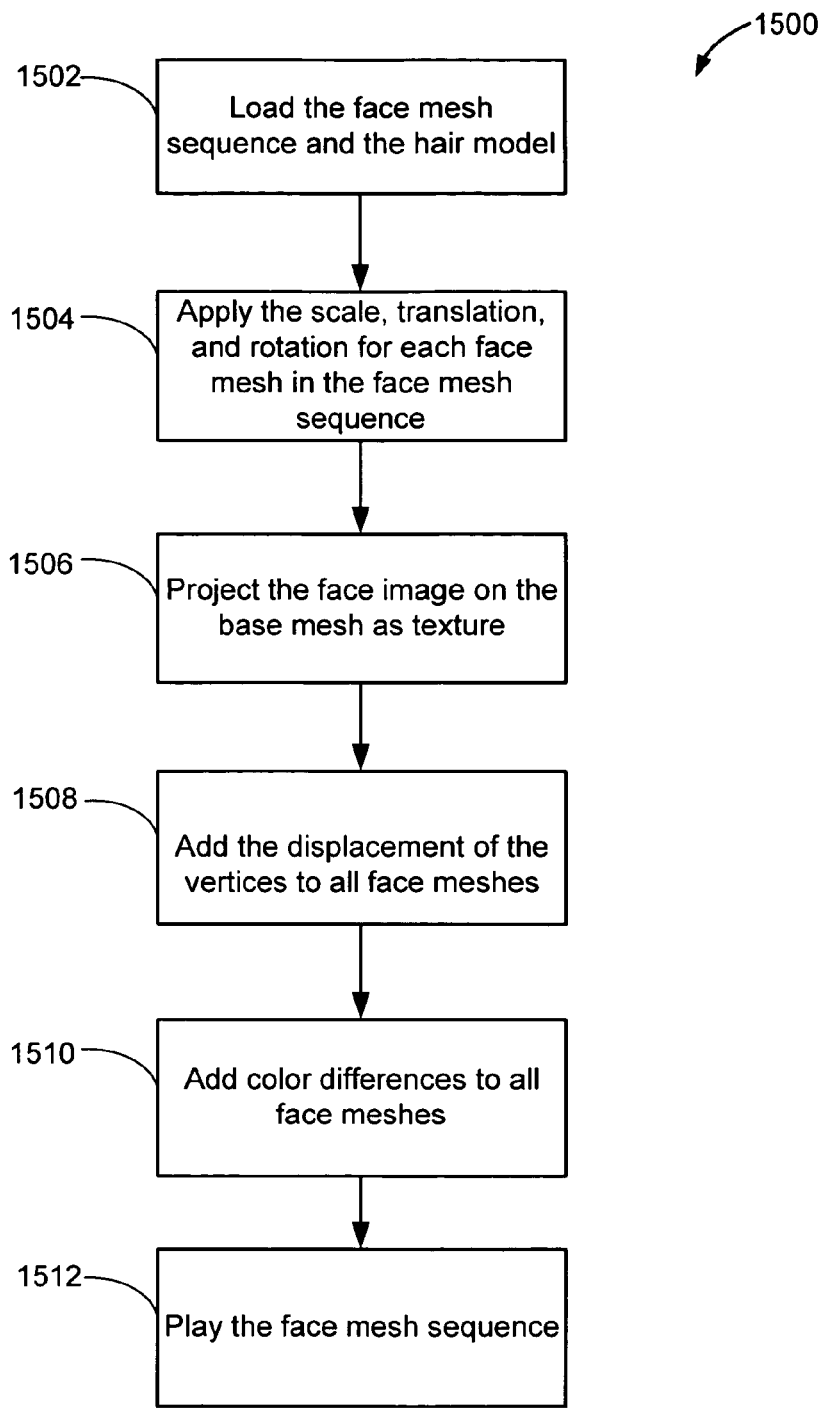
FIG. 15 shows a simplified flow chart for creating facial animation according to one embodiment of the present invention.

FIG. 15 shows a simplified flow chart 1500 for creating facial animation according to one embodiment of the present invention. Step 1502 loads the face mesh sequence and the hair model.

Step 1504 applies the scale, translation, and rotation for each face mesh in the face mesh sequence. These values were saved in step 216 of FIG. 2. This aligns the face meshes to face image 300 in the face mesh sequence.

Step 1506 projects face image 302 to the base mesh and the hair model as texture. Thus, the face image is shown on the face mesh.

Step 1508 adds the displacement of the vertices to all meshes. This is the displacement values that were saved in step 222 of FIG. 2. This matches the feature points and vertices to face image 300. Also, the displacement difference from the base mesh to the other meshes may be used instead of having vertex positions and displacement values for every mesh. For example, the base mesh may have a first displacement value for a vertex. The difference in value for the next face mesh may be stored instead of a new value.

Step 1510 adds color differences that were saved in step 1206 of FIG. 12 to all face meshes. Also, the color difference from the base mesh to the other meshes may be used instead of having vertex positions and color differences for every mesh. For example, the base mesh may have a first color difference for a vertex. The difference in value for the next face mesh may be stored instead of a new value.

Step 1512 then plays the face mesh sequence. Simple, natural, and very realistic face animation is created by playing the face mesh sequence. This animation is provided using a base image of only one sheet (such as a frame or an image) and the face mesh sequence.

Figure 16:
FIG. 16 shows the result of the created animation according to one embodiment.

FIG. 16 shows the result of the created animation according to one embodiment. As shown, animation of the face looks very realistic. Different expressions are created on face image 300 using the face mesh sequence.

Figure 17:
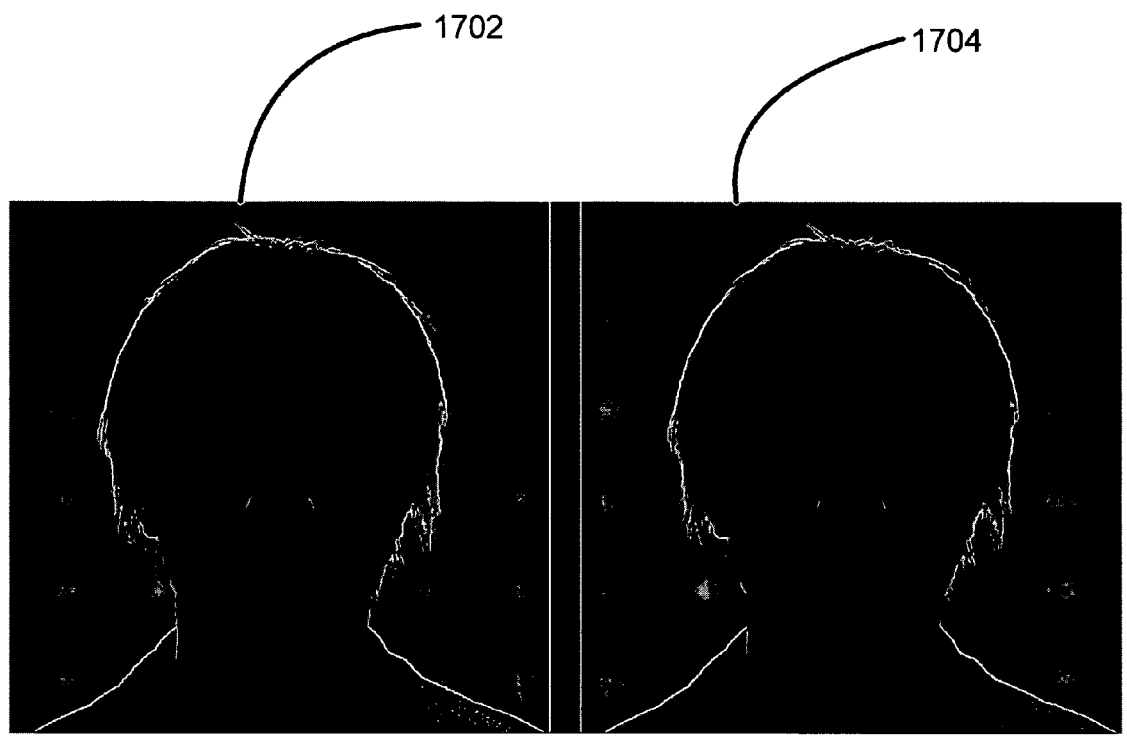
FIG. 17 shows images with color differences added and without according to one embodiment.

FIG. 17 shows images with color differences added and without according to one embodiment. Image 1702 shows an image with the color differences when added and image 1704 shows an image without color differences. As shown, the expression in image 1702 shows the change in light and darkness that are created from the change in form of the facial expression. As shown, ridges and creases are more defined in image 1702.

In other embodiments, speech animations may be created using the above methods. For example, a lip sync animation may be created by synchronizing face meshes of phonemes (called visimes) and speech audio. Thus, other animations will be appreciated by embodiments of the present invention.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. A method for creating facial animation, the method comprising:

determining a face mesh sequence;

selecting a face mesh in the face mesh sequence, the face mesh sequence including the face mesh having a first expression and subsequent face meshes including one or more expression changes from the first expression;

fitting the face mesh of the face mesh sequence to a face image based on features of the face image and features of the face mesh;

determining displacement values for vertices of the face mesh in the fitting for the face mesh, the displacement values used to deform the face mesh to fit the face image based on the features of the face image and the features of the face mesh;

projecting the face image onto the face mesh as texture based on the fitting;

adding the displacement values to vertices in subsequent face meshes in the face mesh sequence;

projecting the face image on the subsequent face meshes, wherein the face image includes a first image expression that is projected onto the face mesh with the first expression and subsequent face meshes with the one or more expression changes, the first image expression being different from the one or more expression changes on the subsequent face meshes; and playing, using a computing device, the face mesh sequence to create facial animation for the face image that shows the first expression in the face mesh and the one or more expression changes in the subsequent face meshes using the same face image with the first image expression, the facial animation created using the face image used to fit the face mesh, wherein the subsequent face meshes are deformed using the displacement values to fit the face image.

2. The method of claim 1, further comprising:
computing a color difference for the subsequent face meshes of the face mesh sequence based on the one or more expression changes for the subsequent face meshes; and
adding the computed color difference for each of the subsequent face meshes in the face mesh sequence to the same face image that was projected onto each of the subsequent face meshes in the face mesh sequence.

3. The method of claim 2, further comprising ignoring any positive color differences.

4. The method of claim 1, further comprising:
creating a hair model from the face mesh; and
fitting the hair model on each face mesh in the face mesh sequence.

5. The method of claim 4, wherein projecting the face image comprises projecting hair of the face image onto the hair model for the face mesh.

6. The method of claim 1, wherein the fitting the face mesh comprises determining scale, rotation, and/or translation values by minimizing a distance between first feature points of the face mesh to second feature points of the face image.

7. The method of claim 6, wherein the scale, rotation, and/or translation values are applied to the vertices in the subsequent face meshes.

8. The method of claim 1, wherein the face mesh sequence is a face mesh recording of a human user.

9. The method of claim 1, wherein the portion of the face mesh sequence is a still image that corresponds to the face image.

10. The method of claim 1, wherein the face image is an image from a face that was not used to create the face mesh.

11. A device for creating facial animation, the device comprising:
one or more processors; and
logic encoded in one or more computer-readable media for execution by the one or more processors and when executed configured to:
determine a face mesh sequence;
select a face mesh in the face mesh sequence, the face mesh sequence including the face mesh having a first expression and subsequent face meshes including one or more expression changes from the first expression;
fit the face mesh of the face mesh sequence to a face image based on features of the face image and features of the face mesh;
determine displacement values for vertices of the face mesh in the fitting for the face mesh, the displacement values used to deform the face mesh to fit the face image based on the features of the face image and the features of the face mesh;

project the face image onto the face mesh as texture based on the fitting;
add the displacement values to vertices in subsequent face meshes in the face mesh sequence;
project the face image on the subsequent face meshes, wherein the face image includes a first image expression that is projected onto the face mesh with the first expression and subsequent face meshes with the one or more expression changes, the first image expression being different from the one or more expression changes on the subsequent face meshes; and
play the face mesh sequence to create facial animation for the face image that shows the first expression in the face mesh and the one or more expression changes in the subsequent face meshes using the same face image with the first image expression, the facial animation created using the face image used to fit the face mesh, wherein the subsequent face meshes are deformed using the displacement values to fit the face image.

12. The device of claim 11, wherein the logic is further configured to:
compute a color difference for the subsequent face meshes of the face mesh sequence based on the one or more expression changes for the subsequent face meshes; and
add the computed color difference for each of the subsequent face meshes in the face mesh sequence to the same face image that was projected onto each of the subsequent face meshes in the face mesh sequence.

13. The device of claim 12, wherein the logic is further configured to ignore any positive color differences.

14. The device of claim 11, wherein the logic is further configured to:
create a hair model from the face mesh; and
fit the hair model on each face mesh in the face mesh sequence.

15. The device of claim 14, wherein the logic configured to project the face image comprises logic configured to project hair of the face image onto the hair model for the face mesh.

16. The device of claim 11, wherein the logic configured to fit the face mesh comprises logic configured to determine scale, rotation, and/or translation values by minimizing a distance between first feature points of the face mesh to second feature points of the face image.

17. The device of claim 16, wherein the scale, rotation, and/or translation values are applied to the vertices in the subsequent face meshes.

18. The device of claim 11, wherein the face mesh sequence is a face mesh recording of a human user.

19. The device of claim 11, wherein the portion of the face mesh sequence is a still image that corresponds to the face image.

20. The device of claim 11, wherein the face image is an image from a face that was not used to create the face mesh.

21. Software encoded in one or more computer-readable media for execution by the one or more processors and when executed operable to:
determine a face mesh sequence;
select a face mesh in the face mesh sequence, the face mesh sequence including the face mesh having a first expression and subsequent face meshes including one or more expression changes from the first expression;
fit the face mesh of the face mesh sequence to a face image of a face based on features of the face image and features of the face mesh;
determine displacement values for vertices of the face mesh in the fitting for the face mesh, the displacement values used to deform the face mesh to fit the face image based on the features of the face image and the features of the face mesh;

project the face image onto the face mesh as texture based on the fitting;

add the displacement values to vertices in subsequent face meshes in the face mesh sequence;

project the face image on the subsequent face meshes, wherein the face image includes a first image expression that is projected onto the face mesh with the first expression and subsequent face meshes with the one or more expression changes, the first image expression being different from the one or more expression changes on the subsequent face meshes; and play the face mesh sequence to create facial animation for the face image that shows the first expression in the face mesh and the one or more expression changes in the subsequent face meshes using the same face image with the first image expression, the facial animation created using the face image used to fit the face mesh, wherein the subsequent face meshes are deformed using the displacement values to fit the face image.

* * * * *